United States Patent
Won

(10) Patent No.: US 12,054,206 B2
(45) Date of Patent: Aug. 6, 2024

(54) STEERING POWER ASSISTANCE SYSTEM AND ELECTRONIC CONTROL DEVICE

(71) Applicant: HL MANDO CORPORATION, Pyeongtaek-si (KR)

(72) Inventor: Jong Chun Won, Yongin-si (KR)

(73) Assignee: HL MANDO CORPORATION, Pyeongtaek-si (KR)

( * ) Notice: Subject to any disclaimer, the term of this patent is extended or adjusted under 35 U.S.C. 154(b) by 296 days.

(21) Appl. No.: 17/629,605

(22) PCT Filed: Jul. 9, 2020

(86) PCT No.: PCT/KR2020/009021
§ 371 (c)(1),
(2) Date: Jan. 24, 2022

(87) PCT Pub. No.: WO2021/015460
PCT Pub. Date: Jan. 28, 2021

(65) Prior Publication Data
US 2022/0281519 A1    Sep. 8, 2022

(30) Foreign Application Priority Data
Jul. 22, 2019   (KR) .......................... 10-2019-0088111

(51) Int. Cl.
*B62D 5/04*   (2006.01)
*B62D 15/02*  (2006.01)

(52) U.S. Cl.
CPC .......... *B62D 5/0463* (2013.01); *B62D 5/046* (2013.01); *B62D 5/0484* (2013.01); *B62D 5/049* (2013.01); *B62D 5/0493* (2013.01); *B62D 15/021* (2013.01)

(58) Field of Classification Search
CPC .... B62D 5/046; B62D 5/0463; B62D 5/0481; B62D 5/0484; B62D 5/049; B62D 5/0493
(Continued)

(56) References Cited

U.S. PATENT DOCUMENTS 10,604,175 B2 *   3/2020   Patel ................... B62D 5/0484
2008/0243339 A1  10/2008   Nishimori et al.
(Continued)

FOREIGN PATENT DOCUMENTS

CN    103303361 A    9/2013
CN    106168521 A    11/2016
(Continued)

OTHER PUBLICATIONS

International Search Report issued for corresponding International Patent Application No. PCT/KR2020/009021 on Oct. 23, 2020, along with an English translation.
(Continued)

*Primary Examiner* — Erick R Solis
(74) *Attorney, Agent, or Firm* — Hauptman Ham, LLP

(57) ABSTRACT

The present disclosure relates to a steering power assistance system and an electronic control device included therein. Specifically, a steering power assistance system according to the present disclosure comprises: two sensors including a dual die integrated circuit; two controllers connected to the two sensors, respectively, and capable of performing internal communication; and a steering motor, wherein among the two controllers, one controller in the following turn in the sequence of controlling generates a control signal and outputs the control signal to the steering motor, according to a target value calculated by another controller which is in a normal state and in the preceding turn in the sequence of controlling.

19 Claims, 11 Drawing Sheets

(58) Field of Classification Search
USPC .................................................... 701/41, 43
See application file for complete search history.

(56) References Cited

U.S. PATENT DOCUMENTS

| | | |
|---|---|---|
| 2011/0218704 A1 | 9/2011 | Kanekawa et al. |
| 2016/0200353 A1 | 7/2016 | Sasaki et al. |
| 2017/0029016 A1 | 2/2017 | Kozawa et al. |
| 2018/0086368 A1* | 3/2018 | Patel .................... B62D 5/0484 |
| 2019/0118856 A1 | 4/2019 | Won |
| 2019/0118857 A1* | 4/2019 | Won ....................... B62D 5/049 |
| 2019/0135336 A1* | 5/2019 | Jeong .................. B62D 5/0475 |
| 2019/0152524 A1 | 5/2019 | Fujita et al. |
| 2020/0198694 A1* | 6/2020 | Kawamura .......... B62D 5/0463 |

FOREIGN PATENT DOCUMENTS

| | | |
|---|---|---|
| CN | 109693709 A | 4/2019 |
| JP | 2017-191093 A | 10/2017 |
| KR | 10-2017-0065430 A | 6/2017 |
| KR | 10-2019-0045466 A | 5/2019 |
| WO | 2017/145797 A1 | 8/2017 |

OTHER PUBLICATIONS

Written Opinion issued for corresponding International Patent Application No. PCT/KR2020/009021 on Oct. 23, 2020.
Chinese Office Action issued on Dec. 8, 2023, in connection with the Chinese Patent Application No. 202080052994.5, 13 pages, with partial English machine translation.
Korean Notice of Allowance issued on Jan. 2, 2023, in connection with the Korean Patent Application No. 10-2019-0088111, 3 pages.

\* cited by examiner

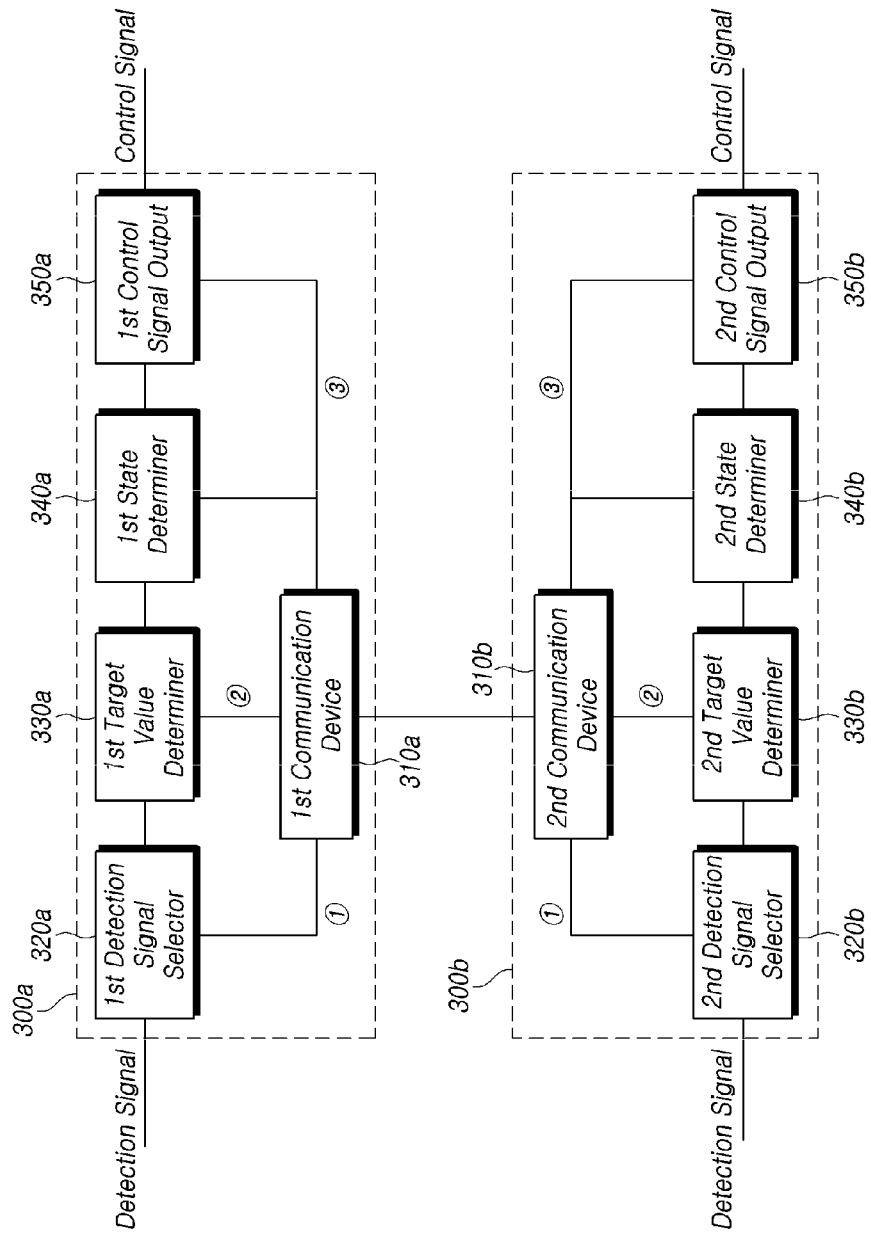

STEERING POWER ASSISTANCE SYSTEM AND ELECTRONIC CONTROL DEVICE

CROSS-REFERENCE TO RELATED APPLICATION

This application is a national phase of PCT/KR2020/009021 filed on Jul. 9, 2020, which is based on and claims priority to Korean Patent Application No. 10-2019-0088111 filed on Jul. 22, 2019, the disclosures of which are incorporated by reference herein in their entireties.

TECHNICAL FIELD

The present disclosure relates to a steering power assistance system and an electronic control device.

BACKGROUND ART

An electronic power steering (EPS) system is a system which assists the steering force so that the driver easily performs steering by using a steering motor.

Recently, for a technology related to autonomous driving, there is actively performed the research on an EPS system equipped with a redundancy system. An EPS system with such a redundancy system generally includes a plurality of sensors, a plurality of electronic circuit units (ECUs), and a plurality of steering motors.

In such a redundancy system, if any one ECU among a plurality of ECUs does not receive detection information from a sensor connected to each, the corresponding ECU is designed to terminate the operation. In this case, the other ECU continues to control the steering motor, but there is a problem in that a certain blank period exists until the other ECU auxiliary controls the steering motor, thereby causing discomfort to the driver.

DETAILED DESCRIPTION OF INVENTION

Technical Problem

In this background, an object of the present disclosure is to provide a steering power assistance system and an electronic control device capable of minimizing the discomfort in driving due to delay in control calculation time by selecting a normal state detection signal even if a specific sensor fails.

In addition, an object of the present disclosure is to provide a steering power assistance system and an electronic control device capable of controlling a steering motor more accurately by sharing a target value of a controller with priority control.

In addition, an object of the present disclosure is to provide a steering power assistance system and an electronic control device which minimizes the discomfort in driving by minimizing the operation of control transfer and continuing normal control even in the event of a system failure.

Technical Solution

In order to solve the above problems, in one aspect, the present disclosure provides a steering power assistance system including a first sensor with a first dual die integrated circuit, a second sensor with a second dual die integrated circuit, a first controller connected to the first sensor, a second controller connected to the second sensor and having a lower priority than a control priority of the first controller, and a dual winding steering motor connected to the first controller and the second controller, wherein the first controller and the second controller perform mutual internal communication, wherein the first controller receives a detection signal of the second sensor through the internal communication, receive a detection signal from the first sensor, and selects a normal state detection signal based on at least two detection signals, wherein the second controller receives a detection signal of the first sensor through the internal communication, receives a detection signal from the second sensor, selects a normal state detection signal based on at least two detection signals, and generates a control signal based on the selected detection signal and output the control signal to the steering motor.

In another aspect, the present disclosure provides a steering power assistance system including a four-channel sensor with two independent dual die integrated circuits, a first controller for receiving two detection signals from a first dual die integrated circuit included in the four-channel sensor, a second controller for receiving two detection signals from a second dual die integrated circuit included in the four-channel sensor and having a lower priority than a control priority of the first controller, and a dual winding steering motor connected to the first controller and the second controller, wherein the first controller and the second controller perform internal communication with each other, wherein the second controller receives a detection signal of the first dual die integrated circuit and a first target signal of the first controller through the internal communication, selects a normal state detection signal based on at least two detection signals among the detection signals of the first dual die integrated circuit and the detection signals of the second dual die integrated circuit, determines a second target value for controlling the steering motor based on the selected detection signal, determines a state of the first controller based on a first target value indicated by the first target signal and the second target value, and generates, if the first controller is normal, a control signal based on the first target value and outputs the control signal to the steering motor.

In another aspect, the present disclosure provides an electronic control device capable of internal communication with other electronic control device including a detection signal selector for receiving one or more detection signals from a first sensor, receiving one or more detection signals from a second sensor through the internal communication, and outputting a normal state detection signal of a sensor based on at least two detection signals, a target value determiner for determining a first target value for controlling a steering motor based on a detection signal output by the detection signal selector, a state determiner for receiving a second target signal output from the other electronic control device through the internal communication, and determining a state of the other electronic control device based on the first target value and a second target value indicated by the second target signal, and a control signal output for, if the state of the other electronic control device is normal, selecting one of the first target value and the second target value according to a preset control priority, and generating a control signal based on the selected target value to output to the steering motor.

Advantageous Effects

According to an embodiment of the present disclosure, it is possible to provide a steering power assistance system and an electronic control device capable of minimizing the discomfort in driving due to delay in control calculation time by selecting a normal state detection signal even if a specific sensor fails.

In addition, according to an embodiment of the present disclosure, it is possible to provide a steering power assistance system and an electronic control device capable of controlling a steering motor more accurately by sharing a target value of a controller with priority control.

In addition, according to an embodiment of the present disclosure, it is possible to provide a steering power assistance system and an electronic control device which minimizes the discomfort in driving by minimizing the operation of control transfer and continuing normal control even in the event of a system failure.

BRIEF DESCRIPTION OF DRAWINGS

FIG. 11 is a diagram for explaining the operation of each of a first electronic control device and a second electronic control device according to the present disclosure.

MODE FOR DISCLOSURE

Hereinafter, it will be described embodiments of the present disclosure in detail with reference to exemplary drawings. Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements. When it is mentioned that an element "is connected to", "is coupled to", or "contacts" the other element, it should be interpreted that, not only can the element is directly connected to, directly coupled to, or directly contact the other element, but another element can also be interposed between the element and the other element.

Figure 1:
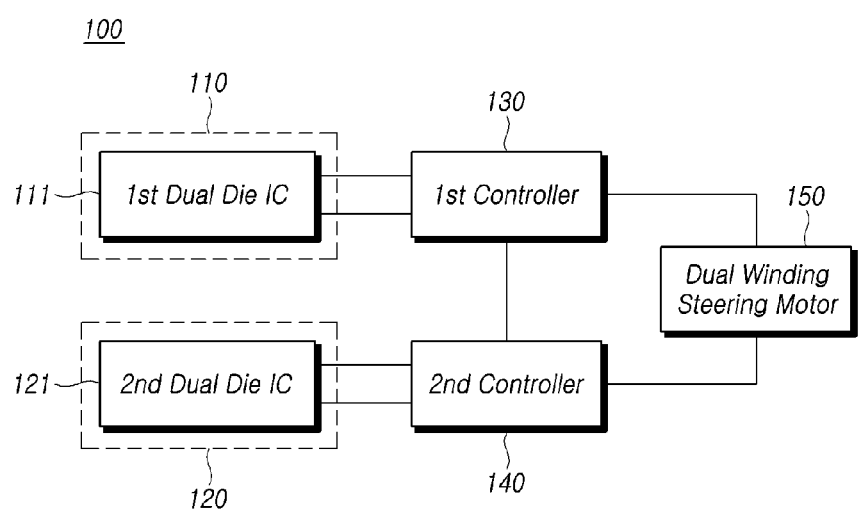
FIG. 1 is a diagram schematically illustrating an embodiment of a steering power assistance system according to the present disclosure.

FIG. 1 is a diagram schematically illustrating an embodiment of a steering power assistance system 100 according to the present disclosure.

Referring to FIG. 1, the steering power assistance system 100 according to the present disclosure may refer to a system which assists steering of a vehicle according to a driver's manipulation of a steering wheel. That is, the steering power assistance system 100 may refer to a system which provides an appropriate steering assistance power according to the driver's manipulation of the steering wheel.

The steering power assistance system 100 may be an electronic power steering (EPS) system using a rotational force of a motor, a steer-by-wire (SbW) system without a mechanical power transmission device, or the like. However, the present disclosure is not limited thereto.

Meanwhile, the steering power assistance system 100 may implement a redundancy system and fail safety for each component included in the system. That is, there may be two sensors, two controllers having the same operation and safety coverage in one steering power assistance system 100. The steering power assistance system 100 may operate the electric steering device by using the other controller in a situation in which one of the two controllers cannot operate normally. Accordingly, even if an abnormality occurs in the operation of one controller, the steering control can be performed using the other controller, so that the overall stability of the steering power assistance system 100 can be improved.

The above-described steering power assistance system 100 capable of implementing a redundancy system and a fail safety based on the redundancy system may include a first sensor 110, a second sensor 120, a first controller 130, a second controller 140 and a steering motor 150.

The first sensor 110 and the second sensor 120 may detect driving information of the vehicle, and output a detection signal corresponding to the driving information to the first controller 130 and the second controller 140, respectively.

The first sensor 110 and the second sensor 120 may be, for example, a vehicle speed sensor for detecting the driving speed of the vehicle, a heading angle sensor for detecting a heading angle of the vehicle, a torque & angle sensor (TAS) for detecting steering angle and steering torque of the steering wheel, a steering angle sensor for detecting a steering angle of the wheel, and the like. Accordingly, the driving information of the vehicle may mean, for example, the driving speed of the vehicle, the heading angle, the steering angle of the steering wheel, the steering torque, the steering angle of the wheel, a rack position, a position of the steering motor 150.

Each of the first sensor 110 and the second sensor 120 may include a dual die integrated circuit (hereinafter, also referred to as a dual die IC) therein.

Here, a first dual die IC 111 included in the first sensor 110 is connected to the first controller 130, and a second dual die IC 121 included in the second sensor 120 is connected to the second controller 140.

The first dual die IC 111 and the second dual die IC 121 may output a plurality of detection signals to the first controller 130 and the second controller 140, respectively. A detailed description thereof will be described later with reference to FIG. 2.

The first controller 130 and the second controller 140 may receive a detection signal from each of the first sensor 110 and the second sensor 120, determine a target value for controlling the steering motor 150 based on the received detection signal, and may output a control signal according to the target value to the steering motor 150.

In this case, if both the first controller 130 and the second controller 140 operate, each of the first controller 130 and the second controller 140 determines a control value obtained by dividing the target value, and may output a control signal corresponding to the control value to the steering motor 150, respectively. In this way, the first controller 130 and the second controller 140 determine a control value obtained by uniformly dividing the target value, so that the steering power assistance system 100 may more stably provide the steering assistance force.

Meanwhile, in order to implement fail safety based on the above-described redundancy system, the first controller 130 and the second controller 140 may perform internal communication, receive a detection signal input from each sensor, a target signal indicating a determined target value, a state signal indicating state information of each controller, and the like, and perform a cross check. In this case, internal communication between the first controller 130 and the second controller 140 may transmit and receive information, signals through, for example, CAN communication. However, the present disclosure is not limited thereto, and if it corresponds to a method for internal communication, all may be applied to the present disclosure, and may be wirelessly or wired.

Here, in the case that any one of the first controller 130 and the second controller 140 fails, only the other controller in the normal state may determine a control value according to the target value within the threshold value, and output a control signal corresponding to the control value to the steering motor 150.

For example, each of the first controller 130 and the second controller 140 outputs a control signal corresponding to a control value that is 50% of a target value to the steering motor 150. The steering motor 150 receives control signals from each of the first controller 130 and the second controller 140, respectively, and is driven to output steering torque based on the entire control signal.

In this case, if the first controller 130 fails, in the case that the target value determined only by the second controller 140 does not exceed the threshold value, a control signal corresponding to the same control value as the target value is transmitted to the steering motor 150. In addition, if the determined target value exceeds the threshold value, a control signal corresponding to the same control value as the threshold value is output to the steering motor 150.

Meanwhile, the two control signals determined from each of the first controller 130 and the second controller 140 may be generally the same, but the target values determined by each of the controllers may be different from each other due to disturbance, and accordingly, the output control signals may also be different from each other.

In this case, there may be determined the priority of the first controller 130 and the second controller 140 in advance, and, unless there is a special circumstance such as a failure of the controller determined by the high priority, there is required to output the control signal based on a target value determined by the high priority controller.

For example, the control priority of the first controller 130 may be lower than the control priority of the second controller 140, or the control priority of the second controller 140 may be lower than the control priority of the first controller 130, however, is not limited thereto.

However, in this specification, for convenience, there is described on the basis that the control priority of the first controller 130 is higher than the control priority of the second controller 140.

Although not shown, for example, the first controller 130 may be an electronic control unit (ECU) including a first microcontroller unit (MCU), a first inverter, a first phase cut-off switch (PCO switch), etc. and similarly, the second controller 140 may be an ECU including a second MCU, a second inverter, and a second PCO switch.

The steering motor 150 may be controlled by the first controller 130 and the second controller 140 to be driven to output a specific rotation speed and torque. Here, the steering motor 150 may be a three-phase motor having a u-phase, a v-phase, and a w-phase, but is not limited thereto, and may be a two-phase motor, a five-phase motor, or the like.

This steering motor 150 may be a brushless DC (BLDC) motor, and since it is controlled by the first controller 130 and the second controller 140, the steering motor may be a dual winding motor. A BLAC motor has a characteristic in which the torque is generated only when a specific voltage vector is applied at a specific rotor angle. Therefore, in the dual winding BLAC motor, it is required to be configured to include the separate motor stator three-phase winding for each winding motor in order for the internal first and second winding motors to operate separately. Therefore, the total number of terminals exposed to the outside of the dual winding BLAC motor is 6. That is, single winding BLAC motor has U, V, and W terminals exposed to the outside, while dual winding BLAC motor has U1, U2, V1, V2, W1, W2 terminals exposed to the outside. Here, U1, V1, and W1 are terminals connected to an inner first winding motor, and U2, V2, W2 are terminals connected to an inner second winding motor.

Each winding motor is driven by a voltage supplied separately to the connected three-phase terminals. In this case, each winding motor can operate independently of each other only when it is connected to a different inverter. In the steering power assistance system 100 of the present disclosure, each of the first controller 130 and the second controller 140 implemented as ECUs includes an inverter, respectively, and the first and second winding motors of the dual winding BLAC motor may operate independently of each other since the connected inverters are different.

Meanwhile, although not shown, the steering power assistance system according to the present disclosure may further include a plurality of batteries for supplying power to each of the first controller 130 and the second controller 140, respectively.

Figure 2:
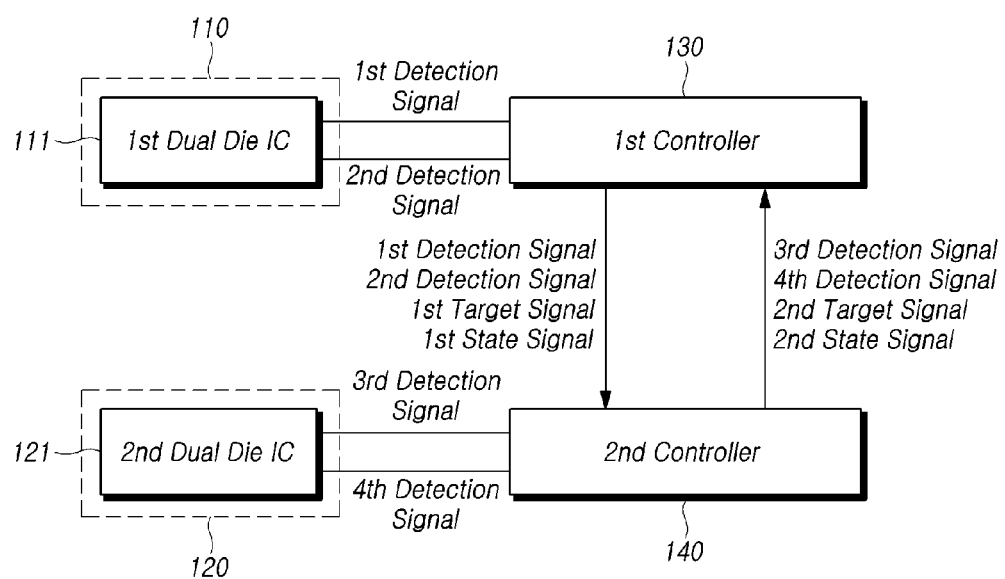
FIG. 2 is a diagram exemplarily illustrating a signal transmitted/received between a sensor and a controller according to the present disclosure.

FIG. 2 is a diagram exemplarily illustrating a signal transmitted/received between a sensor and a controller according to the present disclosure.

Referring to FIG. 2, a first sensor 110 may be connected to the first controller 130. Specifically, the first dual die IC 111 included in the first sensor 110 may output a first detection signal and a second detection signal to the first controller 130.

The second sensor 120 may be connected to the second controller 140. Specifically, the second dual die IC 121 included in the second sensor 120 may output the third detection signal and the fourth detection signal to the second controller 140.

Meanwhile, the first controller 130 may transmit the first detection signal, the second detection signal, a first target signal, and a first state signal to the second controller 140 through internal communication, for example, CAN communication. In this case, the first controller 130 may transmit all of the first detection signal, the second detection signal, the first target signal, and the first state signal to the second controller 140 as necessary, or may transmit only a part of the signals to the second controller 140.

The second controller 140 may transmit the third detection signal, the fourth detection signal, a second target signal, and a second state signal to the first controller 130 through internal communication, for example, CAN communication. In this case, the second controller 140 may transmit the above-described four signals in the same manner as the first controller 130, and may transmit only a part of the signals.

Here, the target signal may mean a signal indicating a target value determined by the controller, and the state signal may mean a signal indicating a state (normal or abnormal) of the controller. A detailed description of the target signal and the state signal will be described later with reference to FIGS. 7 and 8.

Meanwhile, although the detection signals received by each of the first controller 130 and the second controller 140 are generally the same, however, if the first sensor 110 and the second sensor 120 fail due to disturbance, etc., the detection signals input to each of the two controllers may be different from each other.

In this case, the first controller 130 and the second controller 140 may check a sensor in a normal state using a detection signal output from a sensor which is electrically connected and a detection signal output from a sensor which is not electrically connected, and may use the detection signal of the sensor in a normal state.

Figure 3:
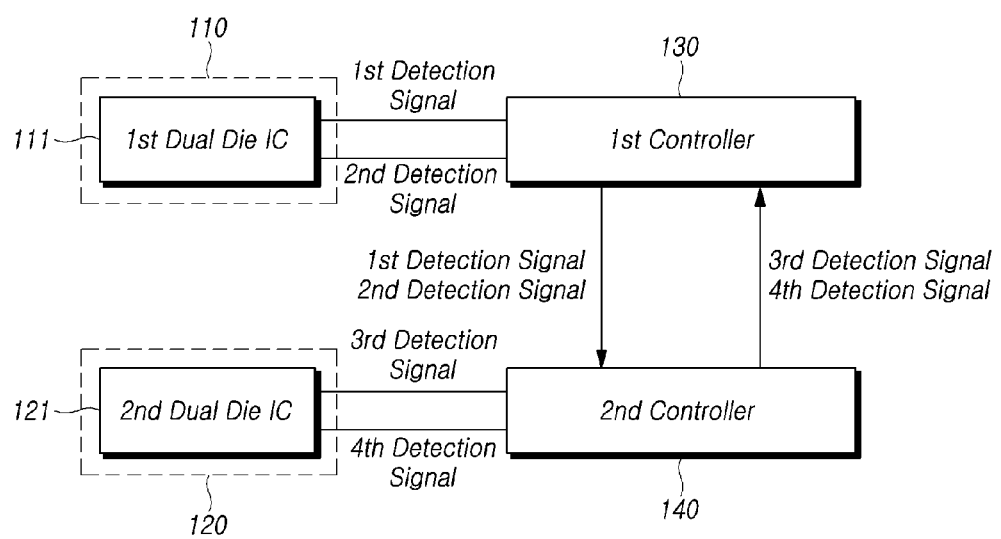
FIG. 3 is a diagram for explaining a first embodiment of selecting a normal state detection signal according to the present disclosure.

FIG. 3 is a diagram for explaining a first embodiment of selecting a normal state detection signal according to the present disclosure.

Referring to FIG. 3, both the first sensor 110 and the second sensor 120 output a detection signal, and, if there are two or more of the same detection signal among a plurality of detection signals output from the first dual die integrated circuit 111 and a plurality of detection signals output from the second dual die integrated circuit 121, at least one of the first controller 130 and the second controller 140 may select the same detection signal as the normal state detection signal.

For example, the first controller 130 may receive the first detection signal and the second detection signal output from the first dual die IC 111, and receive the third detection signal and the fourth detection signal output from the second dual die IC 121 from the second controller 140 through internal communication. If the first detection signal and the third detection signal are the same, the first controller 130 selects the first detection signal or the third detection signal.

As another example, the second controller 140 may receive the first detection signal and the second detection signal from the first controller 130 through internal communication, and may receive the third detection signal and the fourth detection signal. If the first detection signal, the third detection signal, and the fourth detection signal are the same, the second controller 140 may select any one of the first detection signal, the third detection signal, and the fourth detection signal.

Meanwhile, if the detection signals are output from both the first sensor 110 and the second sensor 120, the detection signals output from each of the first sensor 110 and the second sensor 120 may be generally the same. Therefore, in order to perform a simpler calculation operation, if the plurality of detection signals output from the dual die integrated circuit included in the connected sensor are identical to each other, at least one of the first controller 130 and the second controller 140 may select a detection signal output from a connected sensor as the normal state detection signal.

For example, if the first detection signal and the second detection signal are the same, the first controller 130 may select the first detection signal or the second detection signal, regardless of the third detection signal and the fourth detection signal received through internal communication.

For another example, if the third detection signal and the fourth detection signal are the same, the second controller 140 may select the third detection signal or the fourth detection signal, regardless of the first detection signal and the second detection signal received through internal communication.

Meanwhile, even if the detection signals are output from both the first sensor 110 and the second sensor 120, two detection signals output from the first sensor 110 (or the second sensor 120) may be different due to disturbance. Therefore, in order to more accurately detect the normal state detection signal, if the detection signals output from the dual die integrated circuit included in the connected sensor are different from each other, at least one of the first controller 130 and the second controller 140 may select the normal state detection signal by comparing each of the detection signals output from the connected sensor with at least one detection signal received through internal communication.

For example, if the first detection signal and the second detection signal are different from each other, the first controller 130 compares the first detection signal with at least one of the third detection signal and the fourth detection signal, and compares the second detection signal with at least one of the third detection signal and the fourth detection signal. In this case, if the first detection signal is the same as the third detection signal (or the fourth detection signal), but the second detection signal is different from the third detection signal (or the fourth detection signal), the first controller 130 selects the first detection signal.

As another example, if the third detection signal and the fourth detection signal are different from each other, the second controller 140 compares the third detection signal with the first detection signal, and compares the fourth detection signal with the first detection signal. In this case, if the third detection signal is the same as the first detection signal (or a second detection signal), but the fourth detection signal is different from the first detection signal (of the second detection signal), the second controller 140 selects the third detection signal.

Meanwhile, in a specific dual die IC, there may be cases in which any one detection signal is not output to the controller due to disturbance or electrical cutoff. In this case, it is impossible to determine whether a detection signal output from a specific dual die IC is normal or not without a detection signal output from another dual die IC.

Hereinafter, it will be described an embodiment of selecting a normal state detection signal in the case that any one detection signal is not output from the dual die IC.

Figure 4:
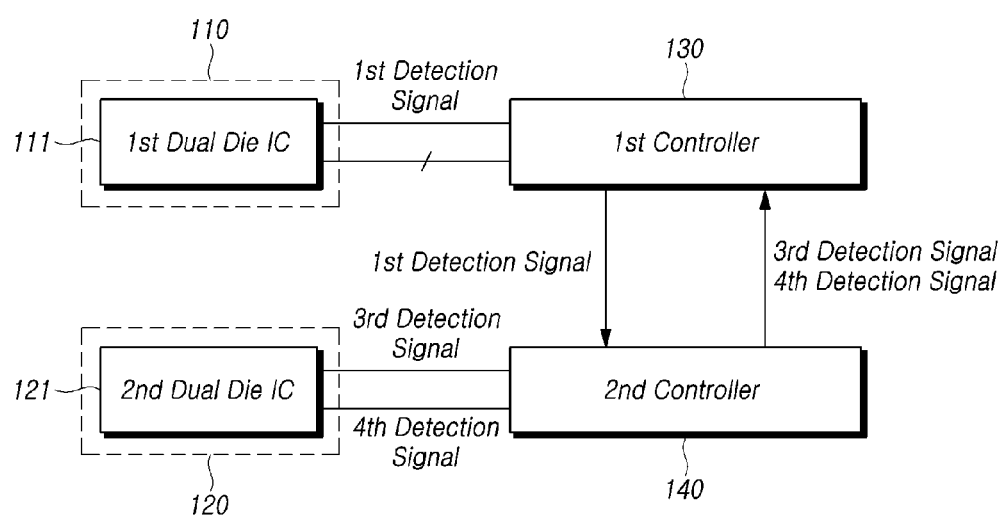
FIG. 4 is a diagram for explaining a second embodiment of selecting a normal state detection signal according to the present disclosure.
Figure 5:
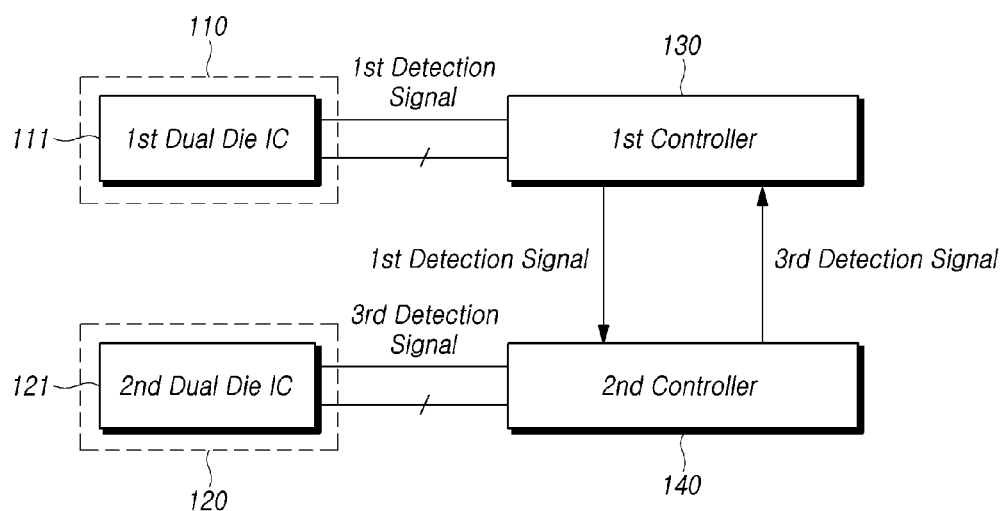
FIG. 5 is a diagram for explaining a third embodiment of selecting a normal state detection signal according to the present disclosure.

FIG. 4 is a diagram for explaining a second embodiment of selecting a normal state detection signal according to the present disclosure, and FIG. 5 is a diagram for explaining a third embodiment of selecting a normal state detection signal according to the present disclosure.

Referring to FIG. 4, if any one detection signal is not output from the dual die integrated circuit included in the connected sensor, at least one of the first controller 130 and the second controller 140 may select the normal state detection signal by comparing the other detection signal output from the dual die integrated circuit included in the connected sensor and at least one detection signal received through internal communication.

Referring to FIG. 4, for example, if the second detection signal is not output from the first dual die IC 111, the first controller 130 compares the received first detection signal with the third detection signal and the fourth detection signal received through internal communication. If the first detection signal is the same as one of the third detection signal and the fourth detection signal, the first controller 130 selects the first detection signal as the normal state detection signal. If the first detection signal is different from the third detection signal and the fourth detection signal, the first controller 130 determines that the first sensor 110 has failed.

In the case that the second detection signal is not output from the first dual die IC 111, the first controller 130 may transmit only the first detection signal to the second controller 140 through internal communication.

Meanwhile, even if the second detection signal from the first dual die IC 111 and the fourth detection signal from the second dual die IC 121 are not output, the normal state detection signal may be selected similarly to that described above with reference to FIG. 4.

Referring to FIG. 5, for example, the second controller 140 compares the received third detection signal with the first detection signal received through internal communication. If the third detection signal is the same as the first detection signal, the second controller 140 selects the third detection signal or the first detection signal as the normal state detection signal.

Meanwhile, in a specific dual die IC, the detection signal may not be output to the controller due to disturbance or electrical cutoff. In this case, at least one of the first controller 130 and the second controller 140 cannot calculate a target value required to control the steering motor 150 using the detection signal without the detection signal output from the other dual die IC.

Figure 6:
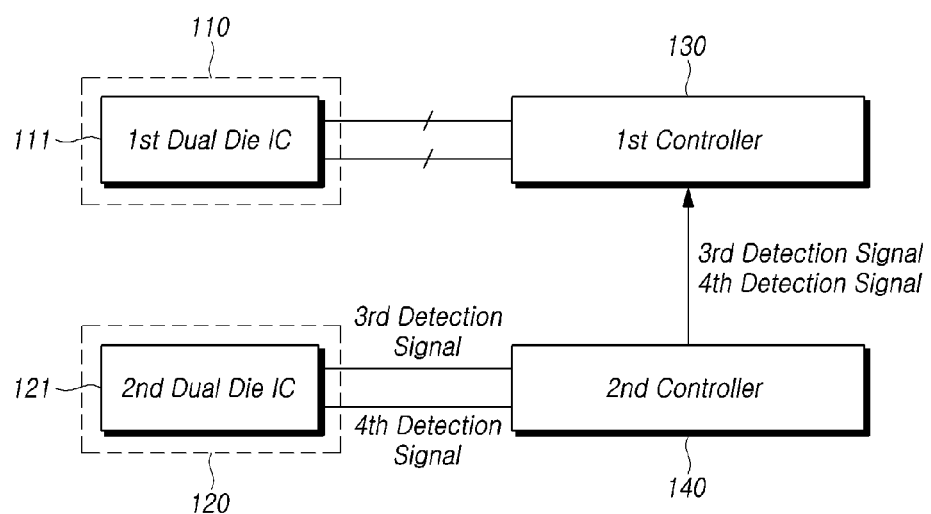
FIG. 6 is a diagram for explaining a fourth embodiment of selecting a normal state detection signal according to the present disclosure.

FIG. 6 is a diagram for explaining a fourth embodiment of selecting a normal state detection signal according to the present disclosure.

Referring to FIG. 6, if the detection signals are not output from all of the dual die integrated circuits included in the connected sensor, one of the first controller 130 and the second controller 140 may select a detection signal received through internal communication as the normal state detection signal.

For example, if the first detection signal and the second detection signal are not output from the first dual die IC 111, the first controller 130 selects the normal state detection signal based on the third detection signal and the fourth detection signal received through internal communication. In this case, the first controller 130 may select the third detection signal or the fourth detection signal, or may select the normal detection signal after determining whether the third detection signal and the fourth detection signal are the same.

As described above, the present disclosure provides an effect of minimizing the discomfort in driving according to the delay of the control calculation time by selecting the normal state detection signal even if a specific sensor fails.

Meanwhile, the controller may determine a target value for controlling the steering motor 150 and a control value according to the target value using the normal state detection signal. Hereinafter, it will be described a method of determining the target value and the control value based on the second controller 140 having a lower priority as described above with reference to FIG. 1.

Figure 7:
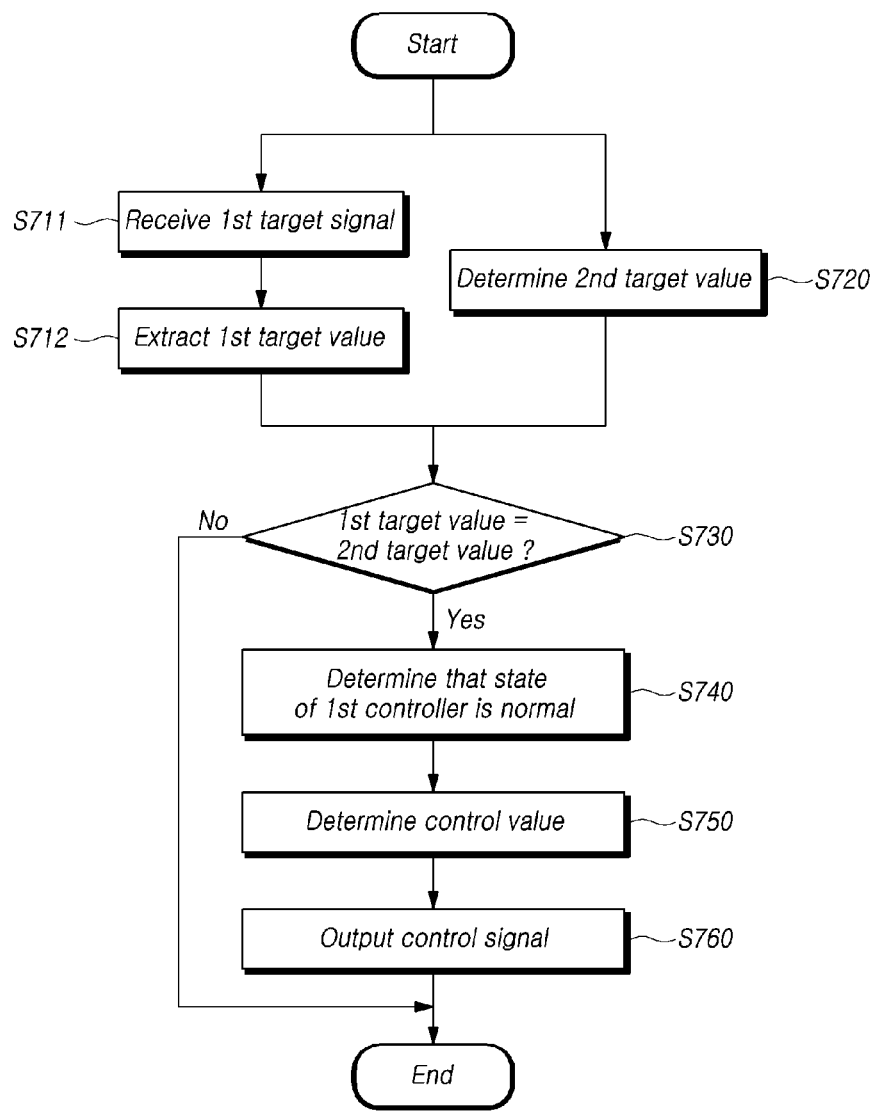
FIG. 7 is a flowchart illustrating an embodiment of determining a control value according to a state of a controller according to the present disclosure.

FIG. 7 is a flowchart illustrating an embodiment of determining a control value according to a state of a controller according to the present disclosure.

Referring to FIG. 7, a first target signal is received in step S711, and a first target value indicated by a first target signal is extracted in step S712. For example, the second controller 140 receives the first target signal output from the first controller 130 through internal communication. In addition, the second controller 140 extracts the first target value from the first target signal.

Meanwhile, in step S720, a second target value is determined. For example, the second controller 140 determines a second target value based on the selected detection signal.

When the first target value is extracted and the second target value is determined, in step S730, it is compared whether the first target value and the second target value are the same. If the first target value and the second target value are the same, it is determined that the state of the first controller 130 is normal in step S740. For example, if the first target value and the second target value are the same, the second controller 140 determines that the state of the first controller 130 is normal.

The control value is determined based on the target value in step S750, and the control signal indicating the determined control value is output in step S760. For example, if the state of the first controller 130 is normal, the second controller 140 determines a control value by reflecting a preset division coefficient to the first target value, and generates the control signal indicating the control value to output to the steering motor 150.

Here, the reason why the second controller 140 with a lower priority uses the first target value when determining the control value, is that, as described above, the first target value of the first controller 130 with a higher priority becomes a reference.

Here, the division coefficient may refer, as described above with reference to FIG. 1, a coefficient reflected to determine the control value obtained by dividing the target value by each of the first controller 130 and the second controller 140 operating normally. For example, the division coefficient may be determined to be 0.5 so that the control value is 50% of the target value, however, is not limited thereto.

As described above, the present disclosure provides an effect of more accurately controlling the steering motor 150 by sharing the target value of the controller having the higher priority of the control.

Meanwhile, if the first target value and the second target value are different, there may be difficult to determine whether the controller is in a normal state only with the target value. In this case, it is required to determine the state of the controller by using a state signal indicating the state of the controller.

Hereinafter, it will be described a method of determining a target value and a control value different from that of FIG. 7, and the description is based on the second controller 140 having a lower priority as described above.

Figure 8:
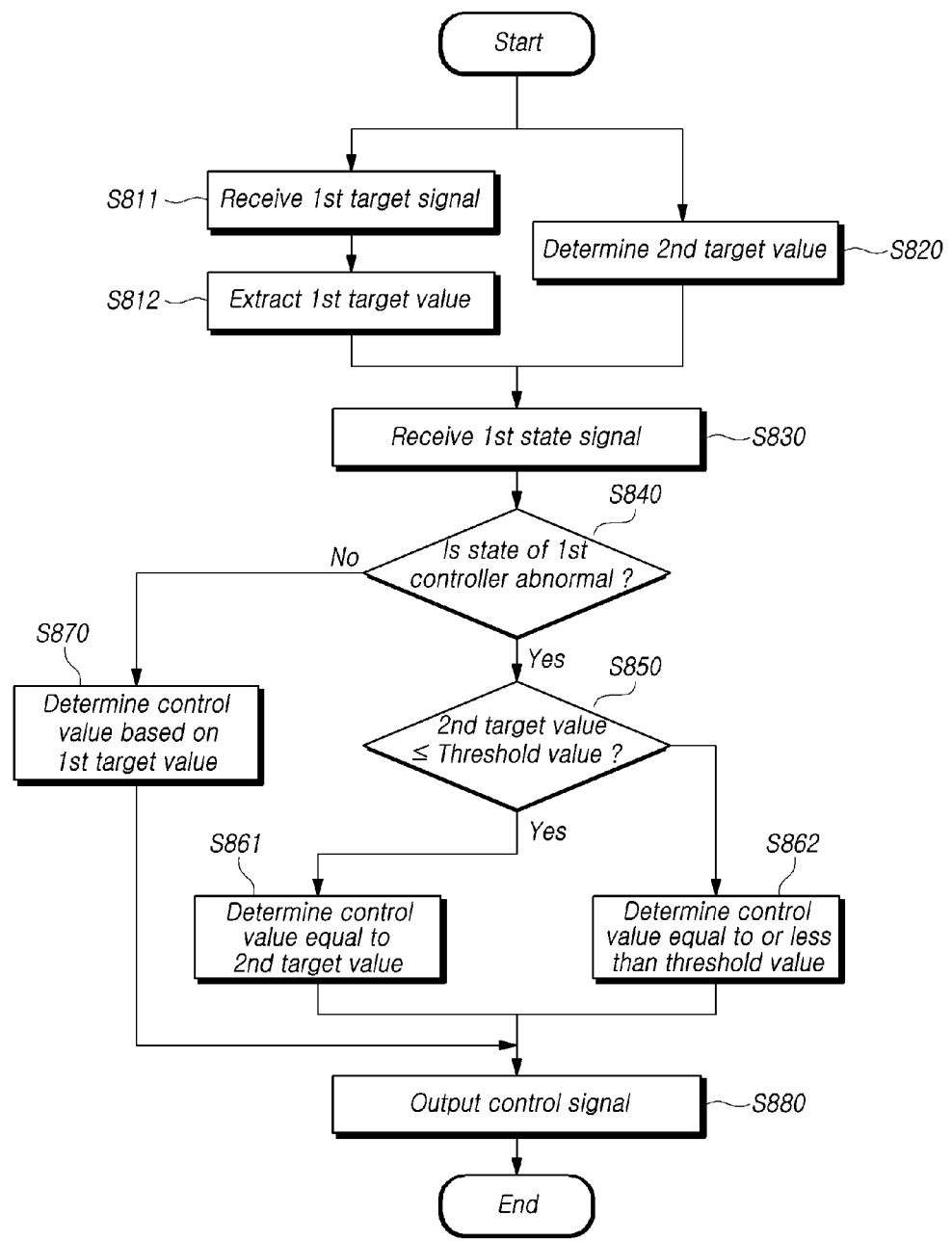
FIG. 8 is a flowchart illustrating another embodiment of determining a control value according to a state of a controller according to the present disclosure.

FIG. 8 is a flowchart illustrating another embodiment of determining a control value according to a state of a controller according to the present disclosure.

Referring to FIG. 8, steps S811, 812, and S820 are the same as steps S711, S712, and S720 described above with reference to FIG. 7, and thus descriptions thereof will be omitted.

Meanwhile, a first state signal is received in step S830, and in step S840, the state of the first controller 130 is determined. Here, the first state signal may mean a signal indicating the state of the first controller 130.

For example, the second controller 140 further receives the first state signal of the first controller 130 through internal communication, and checks the first state information indicated by the first state signal to determine the state of the first controller 130.

If the state of the first controller 130 is abnormal, in step S850, the second target value is compared with a preset threshold value. A control value obtained by changing the second target value is determined according to the comparison result (S861, S862). This is because, since the first target value of the abnormal first controller 130 is unreliable, the steering motor 150 is required to be controlled using the second target value as an alternative solution.

For example, if the state of the first controller 130 is determined as abnormal based on the first state information, the second controller 140 compares the second target value with a preset threshold value, determines a control value obtained by changing the second target value according to the comparison result, generates a control signal indicating the control value, and outputs the generated control signal to the steering motor 150.

Here, the threshold value may refer to a reference value for limiting the control value so that the steering power assistance system 100, the controller, the steering motor 150 are not damaged by overvoltage and overcurrent.

If the second target value is equal to or less than the threshold value, a control value equal is determined to be equal to the second target value in step S861, and if the second target value is greater than the threshold value, the control value is determined to be less than or equal to the threshold value in step S862.

For example, if the second target value is greater than the threshold value, the second controller 140 determines a control value equal to or less than the threshold value. For example, if the second target value is equal to or less than the threshold, the second controller 140 determines a control value equal to the second target value.

Meanwhile, if the state of the first controller 130 is normal, a control value is determined based on the first target value in step S870 as described above with reference to FIG. 7.

As described above, the present disclosure provides an effect of minimizing the feeling of difference or the discomfort in driving by minimizing the operation of transferring the control right and continuing the normal control even if a failure occurs in the system.

Figure 9:
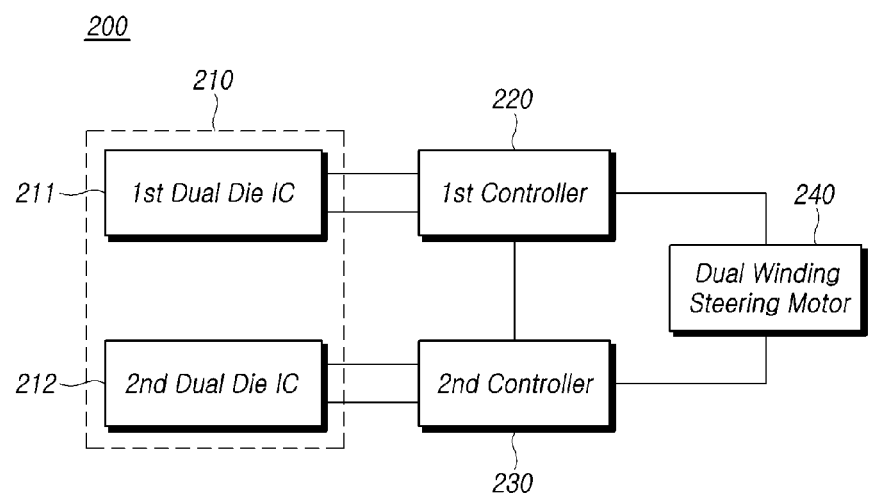
FIG. 9 is a diagram schematically illustrating another embodiment of a steering power assistance system according to the present disclosure.

FIG. 9 is a diagram schematically illustrating another embodiment of a steering power assistance system 200 according to the present disclosure.

Referring to FIG. 9, the steering power assistance system 200 according to the present disclosure includes a four-channel sensor 210, a first controller 220, a second controller 230, a steering motor 150, or the like.

The four-channel sensor 210 may include a plurality of independent dual die ICs, and each dual die IC may be connected to the first controller 220 and the second controller 230.

For example, the four-channel sensor 210 includes two independent dual die ICs, a first dual die IC 211 is connected to the first controller 220, and a second dual die IC 212 is connected to the second controller 230.

Here, as described above with reference to FIG. 2, the first dual die IC 211 may output a first detection signal and a second detection signal to the first controller 220, and the second dual die IC 212 may output the third detection signal and the fourth detection signal to the second controller 230.

The first controller 220 may receive two detection signals from the first dual die IC, and may perform internal communication with the second controller 230.

Here, the control priority of the first controller 220 may be higher than the control priority of the second controller 230.

In this case, the first controller 220 may receive the detection signal output from the second dual die IC 212 through internal communication and receive the detection signal from the first dual die IC 211, and may select the normal state detection signal based on the at least two detection signals.

In addition, the first controller 220 may determine a first target value based on the selected detection signal, output a first target signal indicating the first target value to the second controller 230, and generate a control signal based on the first target value and output the control signal to the steering motor 150.

Since the control priority of the first controller 220 is higher than that of the second controller 230, the first controller 220 may generate the control signal using the first target value regardless of the state of the second controller 230.

However, if the state of the second controller 230 is normal, as described above with reference to FIG. 1, the first controller 220 may determine a control value obtained by dividing the first target value.

As an example, similar to that described above with reference to FIG. 7, the first controller 220 may further receive a second target signal of the second controller 230 through internal communication, and may determine the state of the second controller 230 based on the first target value and a second target value.

As another example, similar to that described above with reference to FIG. 8, the first controller 220 may further receive a second state signal of the second controller 230 through internal communication, and may determine the state of the second controller 230 by checking first state information indicated by the second state signal.

Meanwhile, if the state of the second controller 230 is abnormal, as described above with reference to FIG. 1, the first controller 220 may compare the first target value with the threshold value, and may determine a control value based on the comparison result.

For example, similar to that as described above with reference to FIG. 8, if it is determined that the state of the second controller 230 is abnormal based on the second state information, the first controller 220 may compare the first target value with a preset threshold value, determine a control value obtained by changing the first target value according to the comparison result, and generates a control signal indicative of the control value to output the control signal to the steering motor 150.

Here, similarly as described above with reference to FIG. 8, if the first target value is greater than the threshold value, the first controller 220 may determine a control value equal to or less than the threshold value, and if the first target value is equal to or less than the threshold value, the first controller may determine a control value equal to the first target value.

The second controller 230 may receive two detection signals from the second dual die IC and may perform internal communication with the first controller 220.

Here, the control priority of the second controller 230 may be lower than the control priority of the first controller 220.

In this case, the second controller 230 may receive the detection signal of the first sensor (e.g., the first dual die IC) through internal communication, and may select the normal state detection signal based on at least two detection signals among the detection signal of the first dual die integrated circuit and the detection signal of the second dual die integrated circuit.

In addition, the second controller 230 may determine a second target value based on the selected detection signal, and may output a second target signal indicating the second target value to the first controller 220.

Also, the second controller 230 may receive the first target signal of the first controller 220 through internal communication, and may determine the state of the first controller 220 based on the first target value indicated by the first target signal and the second target value. If the first controller 220 is normal, the second controller may generate a control signal based on the first target value and output the control signal to the steering motor 150.

Meanwhile, the configurations of the first controller 220 and the second controller 230 shown in FIG. 9 may be also applied to the steering power assistance system 200 described above with reference to FIG. 1.

As described above, the present disclosure provides an effect of minimizing the space of components occupied inside the vehicle by including the four-channel sensor 210, thereby contributing to integration.

Hereinafter, an electronic control device capable of performing the functions of the first controllers 130 and 220 or the second controllers 140 and 230 will be described in detail.

Figure 10:
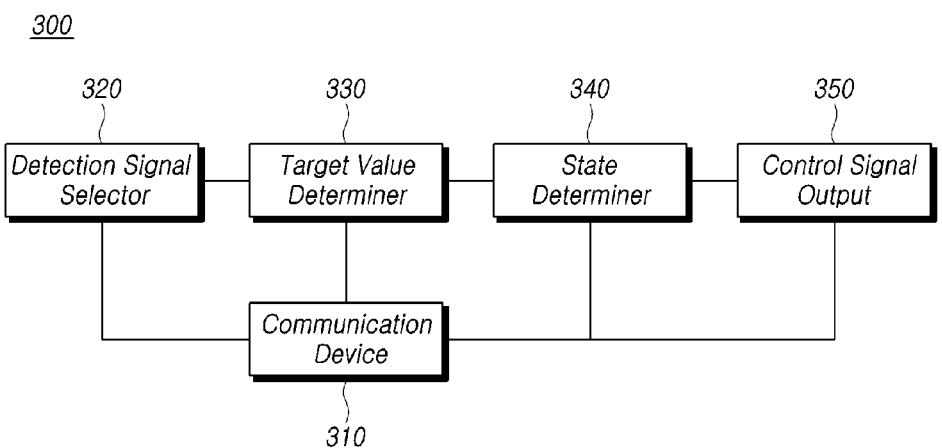
FIG. 10 is a diagram schematically illustrating an electronic control device according to the present disclosure.

FIG. 10 is a diagram schematically illustrating an electronic control device 300 according to the present disclosure.

Referring to FIG. 10, the electronic control device 300 according to the present disclosure may be capable of internal communication with other electronic control devices.

The electronic control device 300 may include a communication device 310, a detection signal selector 320, a target value determiner 330, a state determiner 340 and a control signal output 350, and the like.

The communication device 310 may transmit at least one of a detection signal, a target signal, and a state signal input to the electronic control device 300 to other electronic control device. In addition, the communication device may receive at least one of a detection signal, a target signal, and a state signal from other electronic control device.

The detection signal selector 320 may receive one or more detection signals from the first sensor 110, receive one or more detection signals of the second sensor 120 through internal communication, and output a normal state detection signal of a sensor based on at least two detection signals.

Here, as described above, the first sensor 110 outputs a plurality of detection signals to the electronic control device 300, and the second sensor 120 outputs a plurality of detection signals to other electronic control device.

The target value determiner 330 may determine a first target value for controlling the steering motor based on the detection signal output by the detection signal selector.

The state determiner 340 may receive a second target signal output from other electronic control device through internal communication, and may determine the state of the other electronic control device based on the first target value and a second target value indicated by the second target signal.

Meanwhile, the state determiner 340 may determine the state of the electronic control device 300 and output a state signal of the electronic control device 300 indicating state information of the electronic control device 300.

In the case that the state of the other electronic control device is normal, the control signal output 350 may select any one of the first target value and the second target value according to a preset control priority, and may generate a control signal based on the selected target value and output the control signal to the steering motor.

Meanwhile, the other electronic control device may also perform the same configuration and function as the electronic control device 300.

Hereinafter, it will be described the operations of the electronic control device 300 and other electronic control devices. For convenience, the electronic control device 300 will be described as the first electronic control device 300a, and the other electronic control device will be described as the second electronic control device 300b.

FIG. 11 is a diagram for explaining the operation of each of a first electronic control device 300a and a second electronic control device 300b according to the present disclosure.

Referring to FIG. 11, a first communication device 310a transmits a detection signal received from a first sensor 110 to a second communication device 310b, and receives a detection signal of a second sensor 120 from the second communication device 310b to output to a first detection signal selector 320a (①).

For example, the first communication device 310a transmits the detection signal of the first sensor 110 to the second communication device 310b, and receives the detection signal of the second sensor 120 from the second communication device 310b to outputs to the first detection signal selector 320a.

If the detection signal input from the first sensor 110 and the detection signal of the second sensor 120 received through internal communication are the same, the first detection signal selector 320a may output the detection signal of the first sensor 110 or the detection signal of the second sensor 120 to a first target value determiner 330a.

Meanwhile, if there are two or more of the same detection signal among the plurality of detection signals output from the first sensor 110 and the plurality of detection signals output from the second sensor 120, the first detection signal selector 320a may output the same detection signal to the first target value determiner 330a.

Here, in the case that the first sensor 110 outputs a plurality of detection signals to the first electronic control device 300a, if there is the same detection signal among the plurality of detection signals, the first detection signal selector 320a may output the same detection signal to the first target value determiner 330a.

If the plurality of detection signals are different from each other, the first detection signal selector 320a may output the same detection signal as the detection signal of the second sensor 120 received through internal communication among the plurality of detection signals to the first target value determiner 330a.

Meanwhile, in the case that the second sensor 120 outputs a plurality of detection signals to the second electronic control device 300b, the first detection signal selector 320a may compare the detection signal input from the first sensor 110 with the plurality of detection signals, respectively, and output the same detection signal to the first target value determiner 330a.

Here, if the detection signal input from the first sensor 110 is different from the plurality of detection signals, the first detection signal selector 320a may output the same plurality of detection signals to the first target value determiner 330a.

Meanwhile, the first communication device 310a transmits the first target signal output from the first target value determiner 330a to the second communication device 310b (②), and receives the second target signal of the second target value determiner 330b from the second communication device 310b to outputs to a first state determiner 340a and a first control signal output 350a (③).

The first state determiner 340a may determine that the state of the second electronic control device 300b is normal if the first target value and the second target value are the same.

Meanwhile, if a control priority of the first electronic control device 300a is higher than a control priority of the second electronic control device 300b, the first control signal output 350a may output a control signal based on the first target value to the steering motor.

On the contrary, if the control priority of the first electronic control device 300a is lower than the control priority of the second electronic control device 300b, the first control signal output 350a may output a control signal based on the second target value to the steering motor.

Meanwhile, if the state of the second electronic control device 300b is normal, the first control signal output 350a may determine a control value by reflecting a preset division coefficient in the selected target value, and generate a control signal indicative of the control value to output to the steering motor.

Meanwhile, the first state determiner unit 340a may further receive a state signal of the second electronic control apparatus 300b through internal communication, and may determine the state of the second electronic control device 300b by checking the state information of the second electronic control device 300b indicated by the state signal.

Here, if it is determined that the state of the second electronic control device 300b is abnormal based on the state signal, the first control signal output 350a may compare the first target value with a preset threshold value, determine a control value obtained by changing the first target value according to the comparison result, generate a control signal indicating the control value, and output the generated control signal to the steering motor.

Here, the first control signal output 350a may determine a control value equal to or less than the threshold value if the first target value is greater than the threshold value, and may determine a control value equal to the first target value if the first target value is equal to or less than the threshold value.

As described above, according to the present disclosure, it is possible to provide a steering power assistance system and an electronic control device capable of minimizing the discomfort in driving due to delay in control calculation time by selecting a normal state detection signal even if a specific sensor fails.

In addition, according to an embodiment of the present disclosure, it is possible to provide a steering power assistance system and an electronic control device capable of controlling a steering motor more accurately by sharing a target value of a controller with priority control.

In addition, according to an embodiment of the present disclosure, it is possible to provide a steering power assistance system and an electronic control device which minimizes the discomfort in driving by minimizing the operation of control transfer and continuing normal control even in the event of a system failure.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

As described above, the contents of Korean Patent Application No. 10-2019-0088111 filed in Korea on Jul. 22, 2019 are incorporated into this patent application by reference. In addition, if this patent application claims priority for countries other than the United States for the same reason as above, all the contents are incorporated into this patent application as references.

The invention claimed is:

1. A steering power assistance system comprising:
a first sensor including a first dual die integrated circuit;
a second sensor including a second dual die integrated circuit;
a first controller connected to the first sensor;
a second controller connected to the second sensor and having a lower priority than a control priority of the first controller; and
a dual winding steering motor connected to the first controller and the second controller,
wherein the first controller and the second controller perform mutual internal communication,
wherein the first controller is configured to receive a detection signal of the second sensor through the internal communication, receive a detection signal from the first sensor, and select a normal state detection signal based on at least two detection signals, and
wherein the second controller is configured to:
receive a detection signal of the first sensor through the internal communication, receive a detection signal from the second sensor, and select a normal state detection signal based on at least two detection signals,
generate a control signal based on the selected detection signal and output the control signal to the steering motor,
determine a second target value for controlling the steering motor based on the selected detection signal,
determine a state of the first controller by comparing the second target value with a first target value indicated by a first target signal of the first controller and received through the internal communication, and
determine that the state of the first controller is normal if the first target value and the second target value are the same.

2. The steering power assistance system of claim 1, wherein at least one of the first controller and the second controller is configured to, if there are two or more of the same detection signal among a plurality of detection signals output from the first dual die integrated circuit and a plurality of detection signals output from the second dual die integrated circuit, select the same detection signal as the normal state detection signal.

3. The steering power assistance system of claim 1, wherein at least one of the first controller and the second controller is configured to, if the detection signals output from a dual die integrated circuit included in a connected sensor are the same, select the detection signal output from the connected sensor as the normal state detection signal.

4. The steering power assistance system of claim 1, wherein at least one of the first controller and the second controller is configured to, if the detection signals output from a dual die integrated circuit included in a connected sensor are different from each other, compare each of the detection signals output from the connected sensor with at least one detection signal received through the internal communication to select the normal state detection signal.

5. The steering power assistance system of claim 1, wherein at least one of the first controller and the second controller is configured to, if any one detection signal is not output from a dual die integrated circuit included in a connected sensor, compare the other detection signal output from the connected sensor with at least one detection signal received through the internal communication to select the normal state detection signal.

6. The steering power assistance system of claim 1, wherein at least one of the first controller and the second controller is configured to, if the detection signal is not output from all of dual die integrated circuits included in a connected sensor, select a detection signal received through the internal communication as the normal state detection signal.

7. The steering power assistance system of claim 1, wherein, if the state of the first controller is normal, the second controller determines a control value by reflecting a preset division coefficient to the first target value, generates the control signal indicating the control value, and outputs the control signal to the steering motor.

8. The steering power assistance system of claim 1, wherein the second controller further receives a first state signal of the first controller through the internal communication, and determines the state of the first controller by checking a first state information indicated by the first state signal.

9. The steering power assistance system of claim 8, wherein, if the state of the first controller is abnormal based on the first state information, the second controller compares the second target value with a preset threshold value, determines a control value obtained by changing the second target value according to the comparison result, and generates the control signal indicative of the control value, and output the control signal to the steering motor.

10. The steering power assistance system of claim 9, wherein the second controller determines the control value equal to or less than the threshold value if the second target value is greater than the threshold value, and determines the control value equal to the second target value if the second target value is equal to or less than the threshold value.

11. The steering power assistance system of claim 1, wherein the first controller determines the first target value for controlling the steering motor based on the selected detection signal and outputs the first target signal to the second controller, and generates the control signal based on the first target value to outputs to the steering motor.

12. The steering power assistance system of claim 11, wherein the second controller outputs a second target signal indicating the second target value to the first controller, and the first controller further receives the second target signal through the internal communication and determines a state of the second controller based on the first target value and the second target value.

13. The steering power assistance system of claim 11, wherein the first controller further receives a second state signal of the second controller through the internal communication, and determines a state of the second controller by checking first state information indicated by the second state signal.

14. The steering power assistance system of claim 13, wherein, if the state of the second controller is abnormal based on the second state information, the first controller compares the first target value with a preset threshold value, determines a control value obtained by changing the first target value according to the comparison result, and generates the control signal indicative of the control value, and output the control signal to the steering motor.

15. The steering power assistance system of claim 14, wherein the first controller determines the control value equal to or less than the threshold value if the first target value is greater than the threshold value, and determines the control value equal to the first target value if the first target value is equal to or less than the threshold value.

16. A steering power assistance system comprising:
a four-channel sensor including two independent dual die integrated circuits;
a first controller for receiving two detection signals from a first dual die integrated circuit included in the four-channel sensor;
a second controller for receiving two detection signals from a second dual die integrated circuit included in the four-channel sensor and having a lower priority than a control priority of the first controller; and
a dual winding steering motor connected to the first controller and the second controller,
wherein the first controller and the second controller perform internal communication with each other,
wherein the second controller is configured to:
receive a detection signal of the first dual die integrated circuit and a first target signal of the first controller through the internal communication,
select a normal state detection signal based on at least two detection signals among the detection signals of the first dual die integrated circuit and the detection signals of the second dual die integrated circuit,
determine a second target value for controlling the steering motor based on the selected detection signal,
determine a state of the first controller based on a first target value indicated by the first target signal and the second target value, and
generate, if the first controller is normal, a control signal based on the first target value and outputs the control signal to the steering motor.

17. An electronic control device capable of internal communication with other electronic control device comprising:
a detection signal selector for receiving one or more detection signals from a first sensor, receiving one or more detection signals from a second sensor through the internal communication, and outputting a normal state detection signal of a sensor based on at least two detection signals;
a target value determiner for determining a first target value for controlling a steering motor based on a detection signal output by the detection signal selector;
a state determiner for receiving a second target signal output from the other electronic control device through the internal communication, and determining a state of the other electronic control device based on the first target value and a second target value indicated by the second target signal; and
a control signal output for, if the state of the other electronic control device is normal, selecting one of the first target value and the second target value according to a preset control priority, and generating a control signal based on the selected target value to output to the steering motor.

18. The electronic control device of claim 17, wherein, if the detection signal input from the first sensor is the same as the detection signal of the second sensor received through the internal communication, the detection signal selector outputs the detection signal of the first sensor or the detection signal of the second sensor to the target value determiner.

19. The electronic control device of claim 17, wherein the second sensor outputs a plurality of detection signals to the other electronic control device,
- wherein the detection signal selector compares the detection signal input from the first sensor with the plurality of detection signals, respectively, and outputs the same detection signal to the target value determiner.

* * * * *